(12) United States Patent
Bommarito et al.

(10) Patent No.: US 11,244,439 B2
(45) Date of Patent: Feb. 8, 2022

(54) VISION SYSTEM FOR STATUS DETECTION OF WRAPPED PACKAGES

(71) Applicant: 3M INNOVATIVE PROPERTIES COMPANY, Saint Paul, MN (US)

(72) Inventors: G. Marco Bommarito, Stillwater, MN (US); Jonathan D. Gandrud, Woodbury, MN (US); Robert W. Shannon, Stillwater, MN (US); Gautam Singh, Woodbury, MN (US); Shannon D. Scott, Hudson, WI (US); Muhammad J. Afridi, Woodbury, MN (US); Nicholas A. Asendorf, Saint Paul, MN (US); Claire R. Donoghue, Berkshire (GB)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 310 days.

(21) Appl. No.: 16/359,183

(22) Filed: Mar. 20, 2019

(65) Prior Publication Data

US 2019/0295245 A1    Sep. 26, 2019

Related U.S. Application Data

(60) Provisional application No. 62/645,326, filed on Mar. 20, 2018.

(51) Int. Cl.
  *G06T 7/00*    (2017.01)
  *B65B 57/10*   (2006.01)
  (Continued)

(52) U.S. Cl.
  CPC ............ *G06T 7/0006* (2013.01); *B65B 57/10* (2013.01); *G06T 7/136* (2017.01); *G06T 7/90* (2017.01); *G06T 2207/30108* (2013.01)

(58) Field of Classification Search
  CPC .. G01N 31/226; G06Q 10/087; G06T 7/0006; B65B 57/10
  (Continued)

(56) References Cited

U.S. PATENT DOCUMENTS 4,448,548 A     5/1984   Foley
5,264,700 A  *  11/1993  Tommasini ............. B65B 19/32
                                                    209/536

(Continued)

FOREIGN PATENT DOCUMENTS

DE    102008021490    11/2009
WO    WO 1994-015536   7/1994
(Continued)

OTHER PUBLICATIONS

Afridi, "Automatic in Vivo Cell Detection in MRI", A paper presented in International Conference on Medical Image Computing and Computer-Assisted Intervention, Oct. 2015, 8 pages.

(Continued)

*Primary Examiner* — Eyamindae C Jallow
(74) *Attorney, Agent, or Firm* — Sriram Srinivasan; Jonathan V. Sry

(57) ABSTRACT

Aspects of the present disclosure related to a computer system and method for analyzing whether a package has been opened. The system includes a memory and one or more processors communicatively coupled to the memory and can be configured to receive an image corresponding to a wrapped package. The one or more processors can also be configured to generate a set of feature values based on a visual representation of the wrapped package in the image. The one or more processors can also be configured to apply the set of feature values to at least one model that is trained (Continued)

based at least in part on a set of images that include the wrapped package having the status, to determine the status of the wrapped package.

20 Claims, 9 Drawing Sheets

(51) Int. Cl.
  *G06T 7/136* (2017.01)
  *G06T 7/90* (2017.01)
(58) Field of Classification Search
  USPC .............................................. 705/2; 53/52–5
  See application file for complete search history.

(56) References Cited

U.S. PATENT DOCUMENTS

| | | | |
|---|---|---|---|
| 5,488,815 | A | 2/1996 | Abrams |
| 5,533,315 | A * | 7/1996 | Van Dam ............. B07C 5/3404 53/53 |
| 5,696,686 | A | 12/1997 | Sanka |
| 6,025,189 | A | 2/2000 | Bolea |
| 6,161,695 | A * | 12/2000 | Nicolais ................ A61F 2/0095 206/438 |
| 6,238,623 | B1 | 5/2001 | Amhof |
| 6,485,979 | B1 | 11/2002 | Kippenhan |
| 6,991,761 | B2 | 1/2006 | Hehenberger |
| 7,036,287 | B1 * | 5/2006 | Webb ................ G01N 21/8806 53/53 |
| 7,053,958 | B2 | 5/2006 | Collins |
| 7,422,334 | B2 | 9/2008 | Smith |
| 7,518,502 | B2 | 4/2009 | Austin |
| 7,617,137 | B2 | 11/2009 | Kreiner |
| 7,722,521 | B2 | 5/2010 | Heath |
| 7,734,476 | B2 | 6/2010 | Wildman |
| 7,818,182 | B2 | 10/2010 | Giraldo |
| 8,042,738 | B2 | 10/2011 | Cloix |
| 8,291,472 | B2 | 10/2012 | Bak |
| 9,046,506 | B2 * | 6/2015 | Muller .................... B04B 13/00 |
| 9,305,218 | B2 | 4/2016 | Lewis |
| 9,828,123 | B2 * | 11/2017 | Taghipour ................ B65B 9/04 |
| 9,885,672 | B2 * | 2/2018 | Forutanpour ............. G07F 9/00 |
| 2006/0153736 | A1 | 6/2006 | Kalra |
| 2007/0094303 | A1 | 4/2007 | Zwingenberger |
| 2008/0215366 | A1 | 9/2008 | Robson |
| 2009/0272806 | A1 | 11/2009 | Kemp |
| 2010/0115887 | A1 * | 5/2010 | Schroeder ............... B65B 57/02 53/396 |
| 2011/0246219 | A1 | 10/2011 | Smith |
| 2013/0034682 | A1 | 2/2013 | Free |
| 2013/0066647 | A1 | 3/2013 | Andrie |
| 2013/0114142 | A1 | 5/2013 | Free |
| 2014/0368902 | A1 | 12/2014 | Patel |
| 2015/0043074 | A1 | 2/2015 | Patel |
| 2015/0173843 | A1 | 6/2015 | Maughan |
| 2016/0042130 | A1 | 2/2016 | Broninx |
| 2016/0045276 | A1 | 2/2016 | Pfanner |
| 2016/0321825 | A1 | 11/2016 | Karasawa |
| 2017/0098049 | A1 | 4/2017 | Sweeney |
| 2017/0224438 | A1 | 8/2017 | Johnson |
| 2017/0348452 | A1 | 12/2017 | Kuzelka |
| 2018/0018642 | A1 | 1/2018 | Schmitz |

FOREIGN PATENT DOCUMENTS

| | | |
|---|---|---|
| WO | WO 2007-000639 | 1/2007 |
| WO | WO 2010-018464 | 2/2010 |
| WO | WO 2015-192117 | 12/2015 |
| WO | WO 2017-103804 | 6/2017 |
| WO | WO 2017-117359 | 7/2017 |
| WO | WO 2017-173017 | 10/2017 |
| WO | WO 2018-064212 | 4/2018 |

OTHER PUBLICATIONS

Brownlee, "A Gentle Introduction to Transfer Learning for Deep Learning" Machine Learning Mastery Pty. Ltd. PO Box 206, Vermont Victoria 3133, Australia, [Published on internet on Dec. 20, 2017], [retrieved, from the internet on Apr. 4, 2019], URL <https://machinelearningmastery.com/transfer-learning-for-deep-learning/> 22 pages.

"Gaussian mixture models" Scikit-learn v0.20.3, [retrieved from the internet on Apr. 4, 2019], URL <https://scikit-learn.org/stable/modules/mixture.html> 9 pages.

Kurmann, "Simultaneous Recognition and Pose Estimation of Instruments in Minimally Invasive Surgery", A Paper presented in International Conference on Medical Image Computing and Computer-Assisted Intervention, Oct. 2017,8 pages.

Law, "Surgeon Technical Skill Assessment using Computer Vision Based Analysis", Proceedings of Machine Learning for Healthcare, 2017, JMLR W&C Track vol. 68, 12 pages.

Letouzey, "Instruments Localisation and Identification for Laparoscopic Surgeries", Computational Analysis and Modeling of Medical Activities, M2CAI Reports, 2016, 8 pages.

Mao, "Robotic Handling of Surgical Instruments in a Cluttered Tray", IEEE Transactions on Automation Science and Engineering, Apr. 2015, vol. 12, No. 2, pp. 775-780.

Murillo, "Comparison Between CNN and Haar Classifiers for Surgical Instrumentation Classification", Contemporary Engineering Sciences, 2017, vol. 10, No. 28, pp. 1351-1363.

Sternberg, "Biomedical Image Processing", IEEE Journals & Magazines, Jan. 1983, vol. 16, No. 1, pp. 22-34.

"Subtract background"[ImageJ Documentation Wiki], [retrieved from the internet on Mar. 28, 2018], URL <https://imagejdocu.tudor.lu/doku.php?id=gui:process:subtract_background> 2 pages.

Xu, "Robotic Handling of Surgical Instruments in a Cluttered Tray", IEEE Transactions on Automation Science and Engineering, Apr. 2015, vol. 12, No. 2, pp. 775-780.

* cited by examiner

VISION SYSTEM FOR STATUS DETECTION OF WRAPPED PACKAGES

CROSS REFERENCE TO RELATED APPLICATIONS

This application claims priority from U.S. Provisional Application Ser. No. 62/645,326, filed Mar. 20, 2018, the disclosure of which is incorporated by reference in its entirety herein.

BACKGROUND

Surgical device reprocessing can be performed by the central sterile services department of a hospital. Further, surgical device reprocessing can be prone to failure due to inadequate tracking of complicated, complex processes. Any failure can result in a variety of issues for a hospital such as a cost in loss of productivity, mismanagement of equipment and materials, and even potential harm to patients through healthcare associated infection.

Collecting and analyzing data regarding surgical instruments and their movement throughout the hospitals (from Central Sterile to the Operating Room and back) is important, both for managing inventory and identifying location of the inventory, as well as identifying which instruments are used on which patients.

SUMMARY

Computer vision systems may have difficulty determining whether a wrapped package is opened. For example, some sections of tape may be indistinguishable from other sections of tape due to the analysis of the tape.

Aspects of the present disclosure related to a computer system and method for analyzing whether a package has been opened. The system includes a memory and one or more processors communicatively coupled to the memory. The one or more processors can be configured to receive an image corresponding to a wrapped package comprising a sheet of material disposed around a perimeter of an object and secured by an optically active article disposed on a surface of the sheet of material. The one or more processors can also be configured to generate a set of feature values based on a visual representation of the wrapped package in the image, wherein the set of feature values correspond to features usable to determine a status of the wrapped package, wherein at least one of the set of feature values corresponds to the optically active article. The one or more processors can also be configured to apply the set of feature values to at least one model that is trained based at least in part on a set of images that include the wrapped package having the status, to determine the status of the wrapped package. The one or more processors can also be configured to perform at least one operation based at least in part on the status of the wrapped package.

DETAILED DESCRIPTION

Aspects of the present disclosure relate to determining an opened/unopened status for a wrapped package comprising a group of one or more surgical instruments based on analysis of an image and performing at least one datastore operation (e.g., a record management operation) in response to the status.

Figure 1:
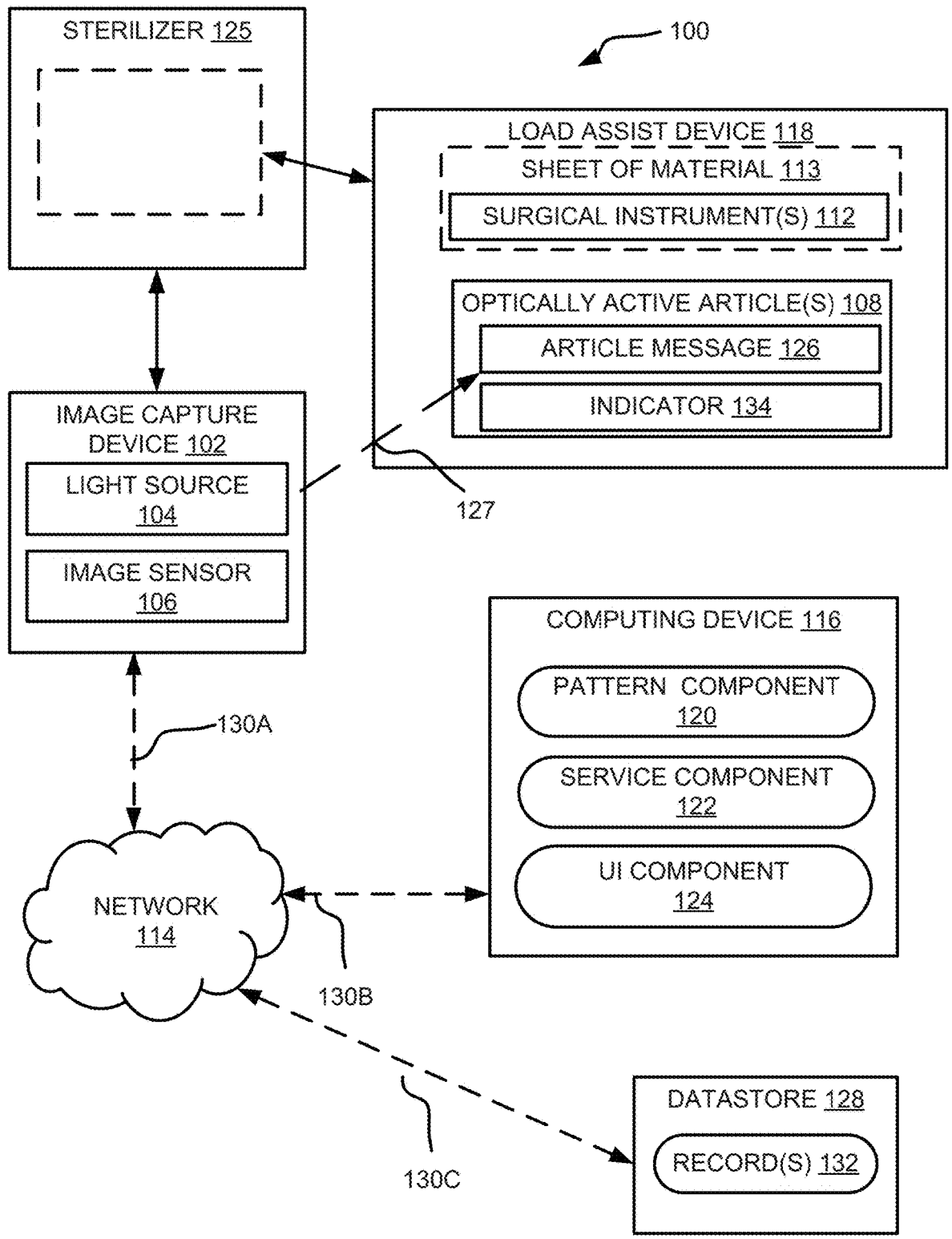
FIG. 1 illustrates a system for performing aspects of the present disclosure.

FIG. 1 is a block diagram illustrating an example system 100 for detecting whether an optically active article 108 and a corresponding group of one or more surgical instruments enter or exits a sterilizer 125. The system 100 can also determine whether a wrapped package featuring a group of one or more surgical instruments has been opened based on an image from the image capture sensor 106, in accordance with techniques of this disclosure. As shown in FIG. 1A, system 100 includes an image capture device 102. Image capture device 102 may include one or more image capture sensors 106 and one or more light sources 104.

System 100 may also include one or more optically active articles 108 as described in this disclosure, such as labels, tags, or plates. The optically active article 108 can be attached to or printed on a group of surgical instruments. For example, the group of surgical instruments can be placed in a wrapped package of surgical instruments and the optically active article 108 is placed on the outside of the wrapped package.

In at least one embodiment, the optically active article 108 is disposed proximate to the group of surgical instruments. The optically active article 108 can be associated with a group of surgical instruments in a datastore 128 (described herein). The wrapped package can be created after the surgical instruments are cleaned and rinsed but prior to sterilization in a sterilizer 125.

In at least one embodiment, an object as referred to herein is any device that undergoes sterilization. The group of one or more surgical instruments can collectively form the object and have at least one perimeter (e.g., lateral or longitudinal perimeter). The sheet of material 113 (such as a non-woven cloth capable of withstanding sterilization conditions) can be disposed around a portion or completely encompassing one or more perimeters of the object sufficient to keep the group contained. The sheet of material 113 and the group of one or more surgical instruments can form a wrapped package. In at least one embodiment, the optically active article 108 can be designed to be optically contrasting with the sheet 113 (e.g., different colors, textures, or material properties).

Examples of optically active article 108 include adhesive tape (with or without a chemical indicator), and a label.

The one or more surgical instruments 112 and an optically active article 108 can be placed in a load assist device 110 (which is capable of withstanding a sterilization process). In at least one embodiment, the load assist device 110 can be a wheeled cart capable of receiving multiple groups of one or more surgical instruments 112. The load assist device 110 can also be a tray capable of receiving multiple groups of one or more surgical instruments 112. The load assist device 110 can be configured to be placed in a sterilizer 125 while allowing a sterilizer 125 to close. In at least one embodiment, the load assist device 110 can be configured to orient one or more groups of surgical instruments such that the optically active article is visible to the image capture device 102.

In at least one embodiment, an optically active article can be disposed on at least one surface of the wrapped package such that it is visible to the image capture device.

Figure 7:
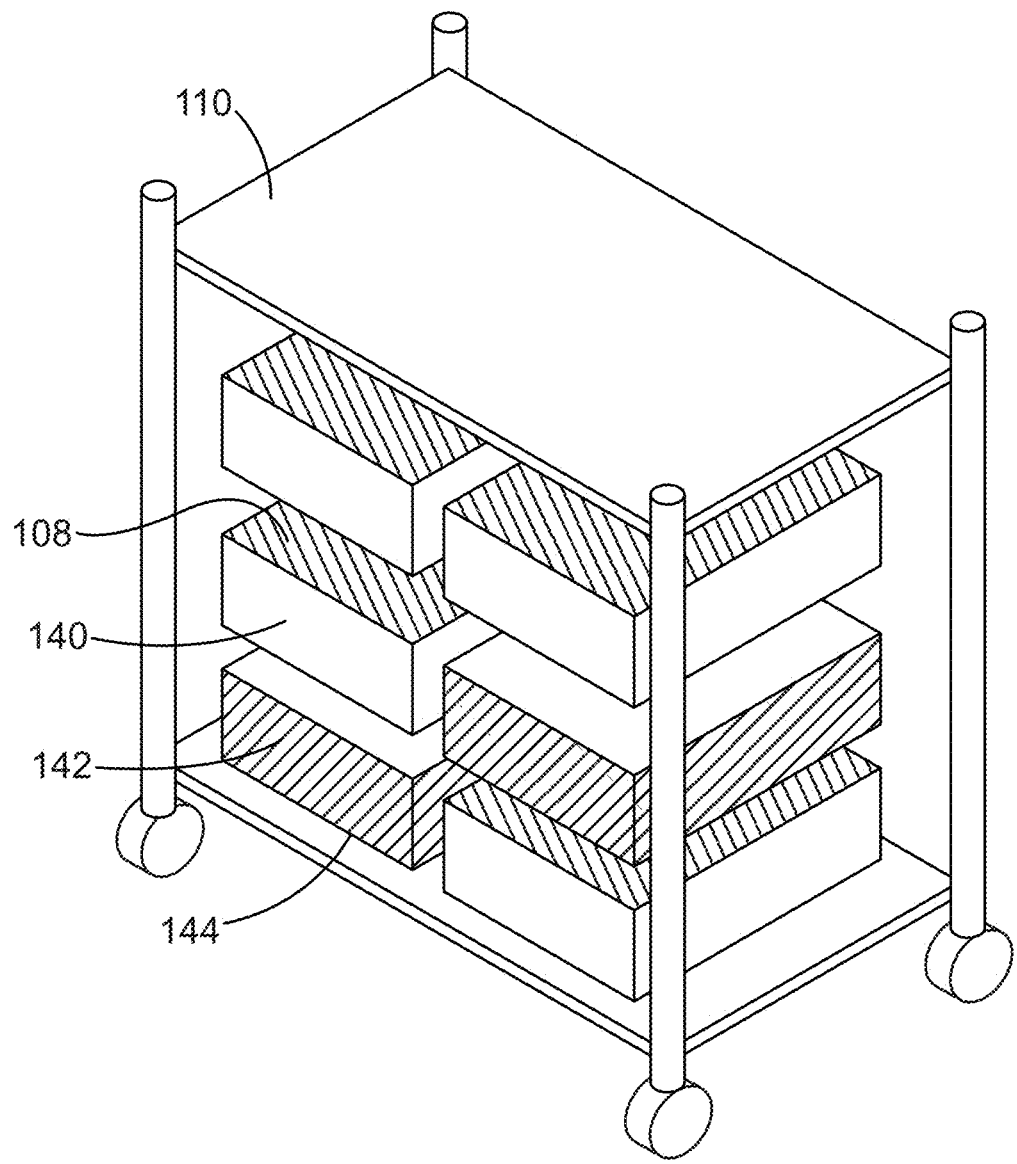
FIG. 7 illustrates a plurality of wrapped packages placed on a load assist device, according to various embodiments.

Referring to FIG. 7 which illustrates a load assist device 110 having a first wrapped package 140, and a second wrapped package 144. The first wrapped package 140 has the optically active article 108 disposed on the top surface such that the top surface is visible to the image capture device 102. The second wrapped package 144 has an optically active article 144 disposed on its side surfaces which also provide a line of sight to the image capture device. Each wrapped package has a group of one or more surgical instruments. In practice, the image capture device can read the optically active articles on and determine the identity of both the first wrapped package 140 and the second wrapped package 144 substantially simultaneously.

Returning to FIG. 1, the sterilizer 125 uses various sterilants (such as Ethylene Oxide, Steam, or Hydrogen Peroxide) to sterilize the surgical instruments 112. The sterilizer 125 may also have a door that can prevent the sterilant from leaking and may also obscure the optically active article 108. In some examples, image capture device 102 is communicatively coupled to computing device 116 via network 114 using one or more communication links. In other examples, as described in this disclosure, image capture device 102 may be communicatively coupled to computing device 116 via one or more forms of direct communication without network 114, such as via a wired or wireless connection that does not require a network.

Image capture device 102 may convert light or electromagnetic radiation sensed by image capture sensors 106 into information, such as digital image or bitmap comprising a set of pixels. Each pixel may have chromiance and/or luminance components that represent the intensity and/or color of light or electromagnetic radiation. In some examples, image capture device 102 captures a first image and wherein the first image of the optically active article is captured in a first spectral range within the near-infrared spectrum. Image capture device 102 may capture a second image of the optically active article in a second spectral range within the visible spectrum.

Image capture device 102 may include one or more image capture sensors 106 and one or more light sources 104. In some examples, image capture device 102 may include image capture sensors 106 and light sources 104 in a single integrated device. In other examples, image capture sensors 106 or light sources 104 may be separate from or otherwise not integrated in image capture device 102. In at least one embodiment, a separate light source 104 can at least be proximate to the image capture device 102. Examples of image capture sensors 106 may include semiconductor charge-coupled devices (CCD) or active pixel sensors in complementary metal-oxide-semiconductor (CMOS) or N-type metal-oxide-semiconductor (NMOS, Live MOS) technologies. Digital sensors include flat panel detectors. In the example, image capture device 102 includes at least two different sensors for detecting light in two different wavelength spectrums. In some embodiments, a first image capture and a second image capture sensor substantially concurrently detect the first and second wavelengths. Substantially concurrently may refer to detecting the first and second wavelengths within 10 milliseconds of one another, within 50 milliseconds of one another, or within 100 milliseconds of one another to name only a few examples.

In some examples, one or more light sources 104 include a first source of radiation and a second source of radiation. In some embodiments, the first source of radiation emits radiation in the visible spectrum, and the second source of radiation emits radiation in the near infrared spectrum. In other embodiments, the first source of radiation and the second source of radiation emit radiation in the near infrared spectrum. In at least one embodiment, the first wavelength may be visible light while the second wavelength can be ultraviolet light. In one example, one or more light sources 104 may emit radiation (e.g., light 127) in the near infrared spectrum.

In some examples, image capture device 102 includes a first lens and a second lens. In some examples, image capture device 102 captures frames at 50 frames per second (fps). Other exemplary frame capture rates include 60, 30 and 25 fps. It should be apparent to a skilled artisan that frame capture rates are dependent on application and different rates may be used, such as, for example, 10 or 20 fps. Factors that affect required frame rate are, for example, application (e.g., moving cart vs stationary cart), vertical field of view.

In some examples, image capture device 102 includes at least two channels. The channels may be optical channels. The two optical channels may pass through one lens onto a single sensor. In some examples, image capture device 102 includes at least one sensor, one lens and one band pass filter per channel. The band pass filter permits the transmission of multiple near infrared wavelengths to be received by the single sensor. The at least two channels may be differentiated by one of the following: (a) width of band (e.g., narrowband or wideband, wherein narrowband illumination may be any wavelength from the visible into the near infrared); (b) different wavelengths (e.g., narrowband processing at different wavelengths can be used to enhance features of interest, while suppressing other features (e.g., other objects, sunlight, headlights); (c) wavelength region (e.g., broadband light in the visible spectrum and used with either color or monochrome sensors); (d) sensor type or characteristics; (e) time exposure; and (f) optical components (e.g., lensing).

The image capture device 102 may be stationary or otherwise mounted in a fixed position relative to the sterilizer 125 and the position of optically active article 108 may not be stationary. Image capture device 102 may capture one or more images of optically active article 108 as a group of surgical instruments 112 passes by image capture device 102. In other examples, however, image capture device 102 may be not be stationary. In some examples, image capture device 102 may be held by a human operator or robotic device, which changes the position of image capture device 102 relative to optically active article 108.

Image capture device 102 may be communicatively coupled to computing device 116 by one or more communication links 130A and 130B. Image capture device 102 may send images of optically active article 108 to computing device 116.

Communication links 130A, 130B, and 130C may represent wired or wireless connections. For instance, communication links 130A and 130B may be wireless Ethernet connections using a WiFi protocol and/or may be wired Ethernet connections using Category 5 or Category 6 cable. Any suitable communication links are possible. In some examples, image capture device 102 is communicatively coupled to computing device 116 by a network 114. Network 114 may represent any number of one or more network connected devices including by not limited to routers, switches, hubs, and interconnecting communication links that provide for forwarding of packet and/or frame-based data. For instance, network 114 may represent the Internet, a service provider network, a customer network, or any other suitable network. In other examples, image capture device 102 is communicatively coupled to computing device 116 by a direct connection, such as Universal Serial Bus (USB) link or other high-speed bus. Although shown separately in FIG. 1, image capture device 102 and computing device 116 may be integrated in a single device or housing. The single device or housing may be attached to a building or other stationary structure, or may not be stationary such that a human operator may carry the single device or housing as a portable structure.

Computing device 116 represents any suitable computing system, which may be remote from or tightly integrated with image capture device 102, such as one or more desktop computers, laptop computers, mainframes, servers, cloud computing systems, etc. capable of sending and receiving information with image capture device 102. In some examples, computing device 116 implements techniques of this disclosure. Using techniques of this disclosure, computing device 116 may determine whether the group of one or more surgical instruments enters or exits the sterilizer 125.

In the example of FIG. 1, computing device 116 includes a pattern component 120 (which can perform the image recognition analysis), service component 122 and user interface (UI) component 124. Components 120, 122, and 124 may perform operations described herein using software, hardware, firmware, or a mixture of both hardware, software, and firmware residing in and executing on computing device 116 and/or at one or more other remote computing devices. In some examples, components 120, 122, and 124 may be implemented as hardware, software, and/or a combination of hardware and software. Computing device 116 may execute components 120, 122, and 124 with one or more processors.

Computing device 116 may execute any of components 120, 122, and 124 as or within a virtual machine executing on underlying hardware. Components 120, 122, and 124 may be implemented in various ways. For example, any of components 120, 122, and 124 may be implemented as a downloadable or pre-installed application or "app." In another example, any of components 120, 122, 124 may be implemented as part of an operating system of computing device 116. In any case, components 120, 122, and 124 may execute at or be implemented at computing devices described herein, which may be an example of computing device 116.

Further, the computing device 116 can be communicatively coupled to a datastore 128 via the network 114 or a direct connection. The datastore 128 may store data in structure or unstructured form. Example datastores may be any one or more of a relational database management system, online analytical processing database, table, or any other suitable structure for storing data.

The datastore 128 can have one or more records 132 which are associated with a group of one or more surgical instruments 112. For example, one package can be tagged with an first optically active article 108 which is associated with a first record 132 for a first group of one or more surgical instruments. A second optically active article can be associated with a second record 128 for a second group of one or more instruments. The record 128 for a group of one or more instruments 112 can be accessed based on the input from the image capture device 102. For example, after every entry or exit of the group of one or more surgical instruments 112 into or out of the sterilizer 125 (which is detected by the image capture device 102 identifying the optically active article 108), the record 132 for the group or any individual surgical can be subject to a record management operation.

The record management operation is any operation that changes the record (e.g., creates a new attribute or record, modifies an attribute of an existing record, or deletes an attribute). In at least one embodiment, the record management operation includes modifying a record in the datastore for the one or more surgical instruments that the one or more surgical instruments are present (e.g., in a package). In the example above, a record for each surgical instrument in the group can be updated to indicate that the surgical instrument was sterilized (or at least placed in the sterilizer) upon both check-in and check-out of the group from the sterilizer 125.

In at least one embodiment, the datastore 128 can include a content datastore (not shown) that may include a series of bits consisting of the payload from content optical elements and the information associated with those series of bits. In some examples, the content datastore may include messages in encoded or decoded form. The datastore 128 can also include a context datastore (not shown) which may include a series of bits consisting of the payload from context optical elements and the information associated with those series of bits. In some examples, the context datastore may include messages in encoded or decoded form. The datastore 128 can also include Error Correction Data which may include a series bits forming codewords constructed by the error correction algorithm which aids in reconstruction and verification of payload data found in the content optical elements and context optical elements. The datastore 128 can include service data which may include any data to provide and/or resulting from providing a service of service component. For instance, service data may include information about optically active articles (e.g., sterilization check-in/out), user information, or any other information.

In the example of FIG. 1, optically active article 108 may include a reflective, non-reflective, and/or retroreflective sheet applied to a base surface. In some examples, an optically active article may be a retroreflective article. An article message, such as but not limited to characters, images, and/or any other information, may be printed, formed, or otherwise embodied on the optically active article 108. The article message 126 can be optically coded in multiple ways. One example of an optical code can be found at PCT/US2017/053801.

The reflective, non-reflective, and/or retroreflective sheet may be applied to a base surface using one or more techniques and/or materials including but not limited to: mechanical bonding, thermal bonding, chemical bonding, or any other suitable technique for attaching retroreflective sheet to a base surface. A base surface may include any surface of an object (such as described above, e.g., an aluminum plate) to which the reflective, non-reflective, and/or retroreflective sheet may be attached. An article message may be printed, formed, or otherwise embodied on the sheeting using any one or more of an ink, a dye, a thermal transfer ribbon, a colorant, a pigment, and/or an adhesive coated film. In some examples, content is formed from or includes a multi-layer optical film, a material including an optically active pigment or dye, or an optically active pigment or dye.

Article message in FIG. 1 is described for illustration purposes as being formed by different areas that either retroreflect or do not retroreflect light. An article message in FIG. 1 may be printed, formed, or otherwise embodied in an optically active article using any light reflecting technique in which information may be determined from the article message. For instance, article message 126 may be printed using visibly-opaque, infrared-transparent ink and/or visibly-opaque, infrared-opaque ink. Any suitable construction, in which article message 126 or portions thereof are distinguishable under one or more lighting conditions, may be used in accordance with techniques and articles of this disclosure.

In FIG. 1, the article message 126 may be printed using a flexographic printing process. For instance, optically active article 108 may include a base layer (e.g., an aluminum sheet), an adhesive layer disposed on the base layer, a structured surface disposed on the adhesive layer, and an overlay layer disposed on the structured surface such as described in U.S. Publications US2013/0034682, US2013/01 14142, US2014/0368902, US2015/0043074.

The structured surface may be formed from optical elements, such as full cubes (e.g., hexagonal cubes or preferred geometry (PG) cubes), or truncated cubes, or beads as described in, for example, U.S. Pat. No. 7,422,334.

In yet other embodiments, a reflective layer is disposed adjacent to the structured surface of the optically active article, in addition to or in lieu of the seal film. Suitable reflective layers include, for example, a metallic coating that can be applied by known techniques such as vapor depositing or chemically depositing a metal such as aluminum, silver, or nickel. A primer layer may be applied to the backside of the cube-corner elements to promote the adherence of the metallic coating.

Characters of article message 126 can be printed such that the material is temperature, pressure, or chemical sensitive. For example, the article message 126 can be modified to indicate that the group of surgical instruments was sterilized after being activated from heat from the sterilizer 125 upon being exposed to direct light (but not ambient light).

In at least one embodiment, an image of optically active article 108 is captured with light in the visible light spectrum. In some examples, a first spectral range is from about 350 nm to about 700 nm (i.e., visible light spectrum) and a second spectral range is from about 700 nm to about 1 100 nm (i.e., near infrared spectrum). In some examples, a first spectral range is from about 700 nm to about 850 nm, and a second spectral range is between 860 nm to 100 nm. In another example, the first or second spectral range can be ultraviolet spectrum (10 nm to 400 nm) which can also further sterilize the one or more surgical instruments. When an image is generated, the visible light 127 is retroreflected back to image capture device 102. As a result of receiving the retroreflected light, article message 126 may appear black, while portions other than article message 126 may appear white or bright relative to. In at least one embodiment, the image capture device 102 can capture only visible light.

In some examples, the first lighting condition includes a first range of wavelengths and the second lighting condition includes a second range of wavelengths that is substantially different from the first range of wavelengths. In some examples, first and second ranges of wavelengths may be substantially different if less than 1% of the wavelengths are the same in each range of wavelengths. In some examples, first and second ranges of wavelengths may be substantially different if the fewer than between 1% and 10% of the wavelengths are the same in each range of wavelengths. In some examples, first and second ranges of wavelengths may be substantially different if the amount of wavelengths are the same in each range is less than a threshold amount.

In some examples, article message 126 include ink compositions and are provided on optically active article 108 using flexographic printing. In addition to ink compositions, other exemplary suitable materials for forming barrier materials include at least one of coating compositions, films (e.g., polymeric), or additives that reduce or eliminate adhesion of the underlying adhesive layer. Furthermore, other techniques may also be used, such as needle die coating, gravure printing, ink jet printing, screen printing, thermal mass transfers printing, laser printing, or any other suitable printing technique.

In some examples, a second image may be captured under IR lighting. For an image of optically active article 108 captured under IR lighting conditions, ink portions may not appear black but rather as the color and/or brightness of an area of retroreflective sheeting without retroreflective elements, such as barrier material or other retroreflective structures described in this disclosure.

Computing device 116 may receive, from image capture device 102, a first image of the optically active article 108, under a first lighting condition, such as visible light. In at least one embodiment, the first image can be captured under ambient lighting conditions (i.e., without light from the light source 104). Computing device 116 may receive a second image of the optically active article 108, under a second lighting condition, such as lighted by light from the light source 104 infrared light. In some examples, computing device 116 may receive the second image from image capture device 102, while in other examples, computing device 116 may receive the second image from a separate, different image capture device 102.

In some examples, the first image and the second image are captured at a substantially same time. In some examples, substantially the same time may include capturing the first and second images within a time range of 50 milliseconds to 2 second of one another. In some examples, substantially the same time may include capturing the first and second images within a time range of 50 milliseconds to 200 milliseconds of one another. In some examples, substantially the same time may include capturing the first and second images within a threshold time range of one another, wherein the threshold time range is hard-coded, user-defined, or machine-generated.

In at least one embodiment, the computing device 116 can receive a status of the indicator 134 from the image capture device 102. For example, the indicator 134 can be a chemical indicator 134 that is embedded, attached to, or proximate to the optically active article 108. The computing device 116 can determine whether the chemical indicator is present with the one or more surgical instruments based on first image or the second image and determine the status of the chemical indicator 134 from the first or second image. In at least one embodiment, the computing device 116 can perform at least one operation in response to the determination of the presence or status of the chemical indicator 134 (e.g., modify a record for the one or more surgical instruments in the group). In at least one embodiment, the indicator portion of the is responsive to environmental condition and can modify the underlying article message of the optically active article 108.

Figure 2:
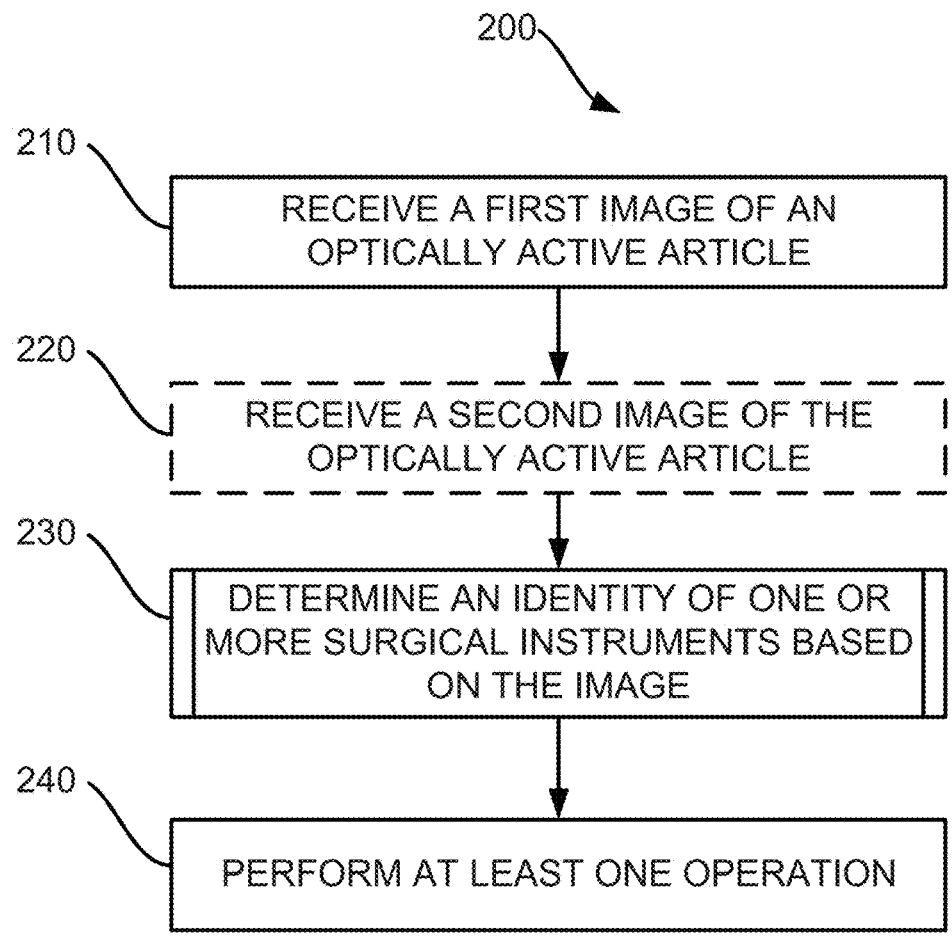
FIG. 2 illustrates a flowchart of a method of processing an image featuring an optically active article, according to various embodiments.

FIG. 2 illustrates a method 200 for tracking a group of one or more surgical instruments based on an optically active article. The method 200 can begin at block 210.

In block 210, the computing device can receive, from the image capture device, a first image of the optically active article under a first lighting condition. The optically active article can be positioned proximate to and proximate with a group of one or more surgical instruments (as discussed herein). The optically active article can be responsive to a first lighting condition and be at least partially readable by the image capture device. The first lighting condition can be a light using a first range of wavelengths. In at least one embodiment, the lighting condition can be light that is ambient within the visible spectrum. The first lighting condition can be direct lighting or indirect lighting. For example, if the first lighting condition is direct, then the optically active article can be captured based on a response to a flash (i.e., high intensity light of at least 100000 lumens for at least 1 ms) from a light source.

In block 220, the computing device can receive a second image of the optically active article under a second lighting condition influenced by the light source. In at least one embodiment, block 220 can be optional. For example, the computing device may process images of optically active articles under a direct lighting condition without considering a baseline image (which may use ambient or indirect lighting for comparison). In at least one embodiment, the computing device can also analyze images from an optically active article under indirect lighting and the optically active article under direct lighting to better analyze the points of high intensity to achieve a higher resolution of a retroreflective feature. In at least one embodiment, the first image and the second image are captured at substantially the same time and the second image of the optically active article is received from the image capture device.

The second lighting condition can be a second range of wavelengths. The optically active article can be responsive to at least part of the second range of wavelengths. In one embodiment, the second range of wavelengths is substantially different from the first range of wavelengths. In at least one embodiment, the second range of wavelengths can be in the ultraviolet spectrum to further sterilize the group of one or more surgical instruments. Other wavelengths also have benefits. For example, using wavelengths of light in the near-IR can be invisible to the human eye and not disorient an operator of the sterilizer.

In block 230, the computing device can determine an identity of the one or more surgical instruments based on first image and/or the second image. The computing device can read the optically active article an interpret the optically active article through a variety of means such as machine learning models, pattern matching, or other vision-based model. In at least one embodiment, the computing device can determine the identity of a retroreflective optically active article as described in U.S. Publication US2016/0321825. The optically active article can be encoded with a particular alphanumeric value. The computing device can further interpret the alphanumeric value upon analyzing the image. In at least one embodiment, the optically active article can use various encoding methods and the computing device can decode the code of the optically active article.

The alphanumeric value can further link to a record in the datastore corresponding to a group of one or more surgical instruments. The record can also be associated with records for each of the surgical instruments. For example, if a first group has a first surgical instrument, a second surgical instrument and a third surgical instrument, and a first optically active article is associated with the first group in a datastore, then the computing device can determine the identity of the one or more surgical instruments by identifying an alphanumeric sequence from the first optically active article. The alphanumeric sequence can be used to identify a record in a datastore. The record can be an inventory list of the first, second, and third surgical instruments in the first group. The computing device can perform an operation to the record for the group, the first, second, and/or third surgical instrument as in block 240.

In block 230, the computing device can determine an identity of multiple groups of surgical instruments. For example, the computing device can analyze a first and second optically active article that are aligned with the image capture device. As opposed to scanning each individual bar code, an entire cart of packages can be scanned substantially simultaneously in real-time as it both enters and exits the sterilizer. In at least one embodiment, substantially simultaneously means in a manner of time where it would be indistinguishable to a user (e.g., less than 30 seconds).

In at least one embodiment, if the optically active article is of a known dimension, then only one image may be necessary. For example, if retroreflective points are placed on the optically active article in known positions, then the computing device can interpret an alphanumeric sequence based on the dimensions of the optically active article and the retroreflective points (as a result of direct lighting).

In block 240, the computing device can perform at least one operation in response to the determination of the identity of the group, e.g., a record management operation.

Figure 3:
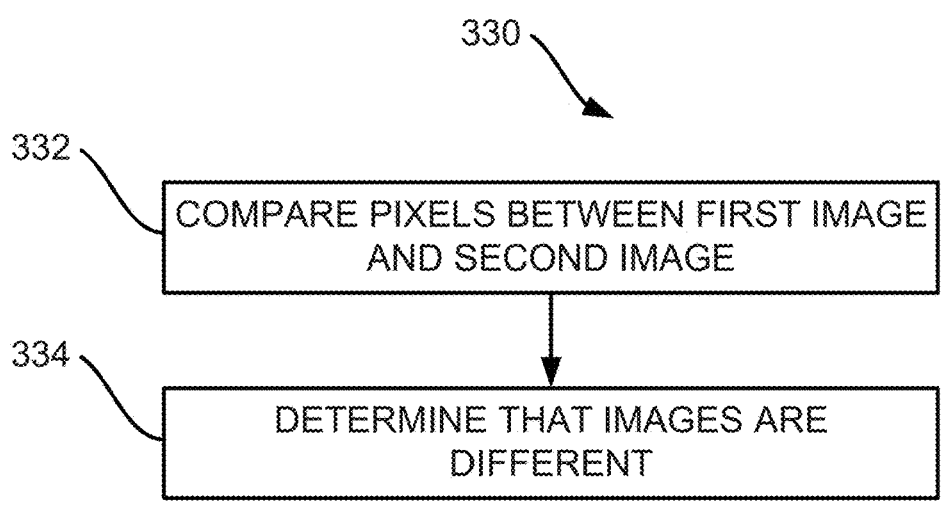
FIG. 3 illustrates a flowchart of a method of identifying an optically active article based on the image, according to various embodiments.

FIG. 3 illustrates an example method 330 of determining the identity of the group of surgical instruments. The method 330 can begin at block 332.

In block 332, the computing device can compare a first set of pixels that correspond locations of a first portion of the identifying information to a second set of pixels that correspond to locations of a second portion of the identifying information. The computing device can also identify pixels that are different intensities. For example, if the first image is taken with indirect lighting and the second image is taken with direct lighting, the computing device can identify retroreflective points of the second image and scale them relative to the first image.

In block 334, the computing device can determine, based at least in part on the comparison, that the first set of pixels is different from the second set of pixels by at least a threshold amount. The threshold amount can be further based on the intensity values of the pixel. In at least one embodiment, the computing device can determine, based at least in part on the comparison, that the first image of the optically active article and the second image of the optically active article are different. The computing device can also determine a confidence value that indicates at least one of a degree of difference or a degree of similarity between a first region of the first image and a second region of the second image. In response to a determination that the confidence value satisfies a threshold, the computing device can determine that the first image of the optically active article and the second image of the optically active article are different.

Figure 4:
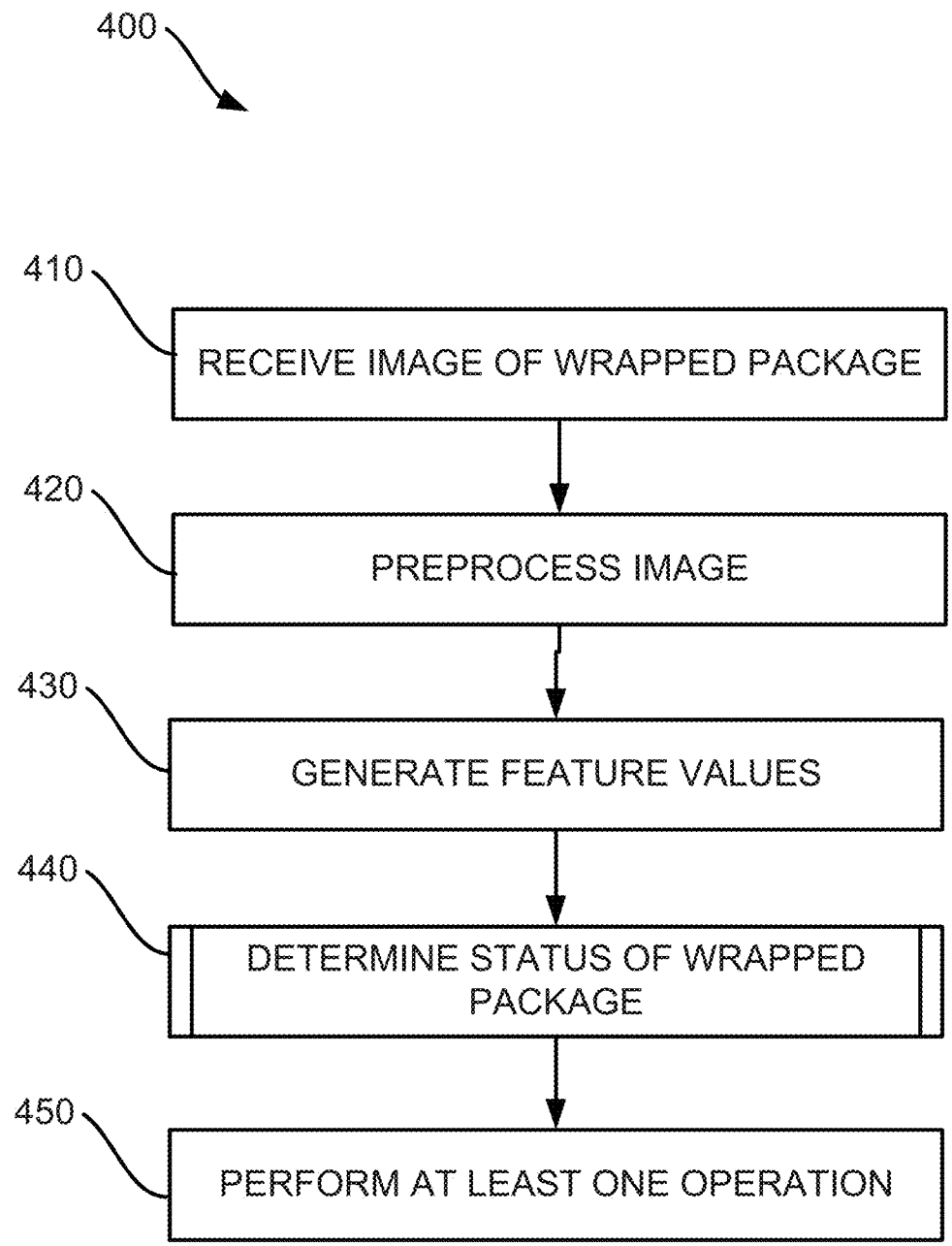
FIG. 4 illustrates a flowchart of a method of processing an image featuring a wrapped package, according to various embodiments.

FIG. 4 illustrates a method 400 of determining a status of a wrapped package from an image. The method 400 can begin at block 410.

In block 410, the computing device can receive an image corresponding to a wrapped package comprising a sheet of material disposed around a perimeter of an object and secured by an optically active article disposed on a surface of the sheet of material. At least one optically active article (such as tape) can be used to secure the sheet of material to keep a group of surgical instruments together (or prevent the group from separating). The image can include at least part of or the entire optically active article within the frame. The image can be received from a datastore, another computer, or from the image capture device in real-time.

In block 420, the computing device can pre-process the image responsive to receiving the image. Pre-processing the image refers to converting the image into a predetermined format which can include image width, image height, pixels and channels. Pre-processing can include maintaining an aspect ratio, image scaling, mean image, data normalization, dimensionality reduction, data augmentation, or combinations thereof.

Figure 6A:
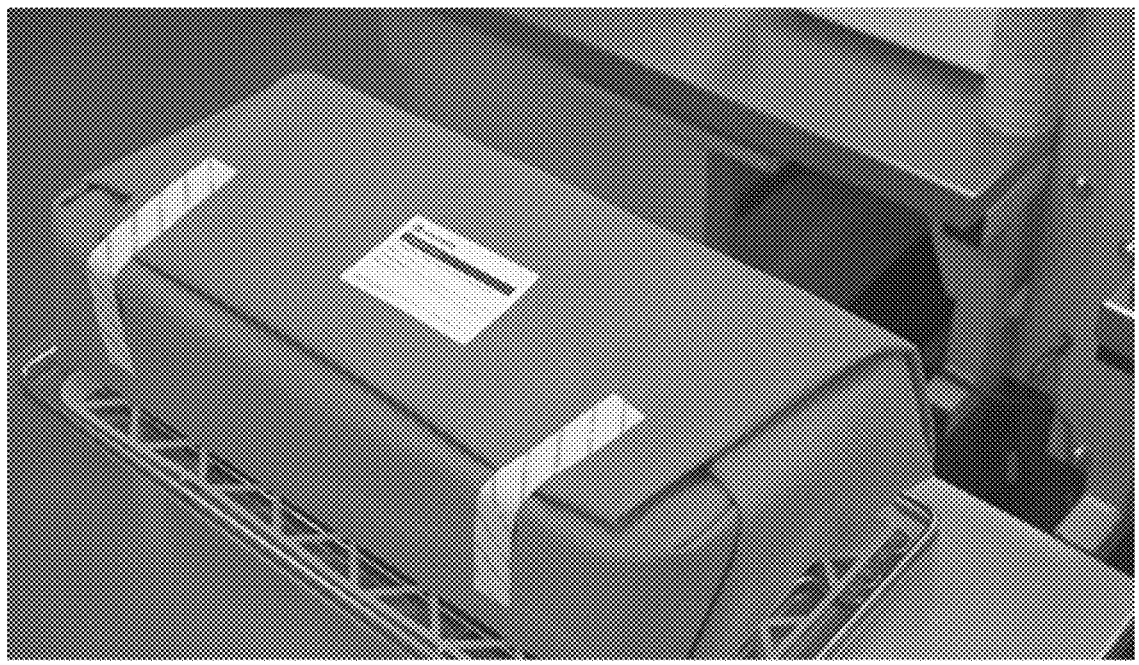
FIG. 6A illustrates an image of a wrapped package, according to various embodiments.
Figure 6B:
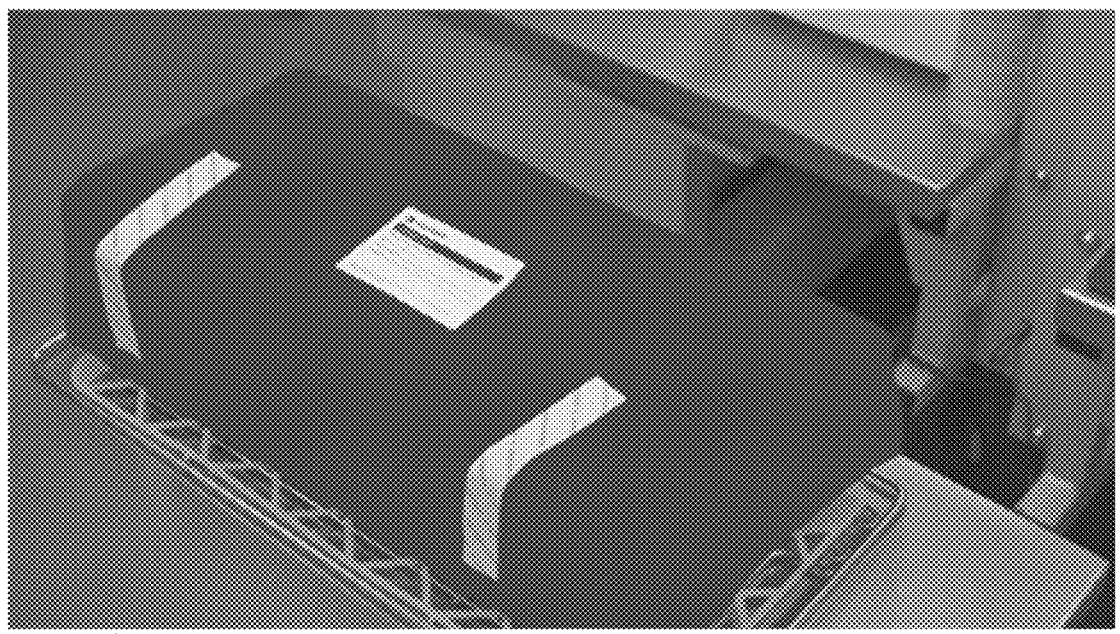
FIG. 6B illustrates a highlighted image of the wrapped package of FIG. 6A, according to various embodiments.
Figure 6C:
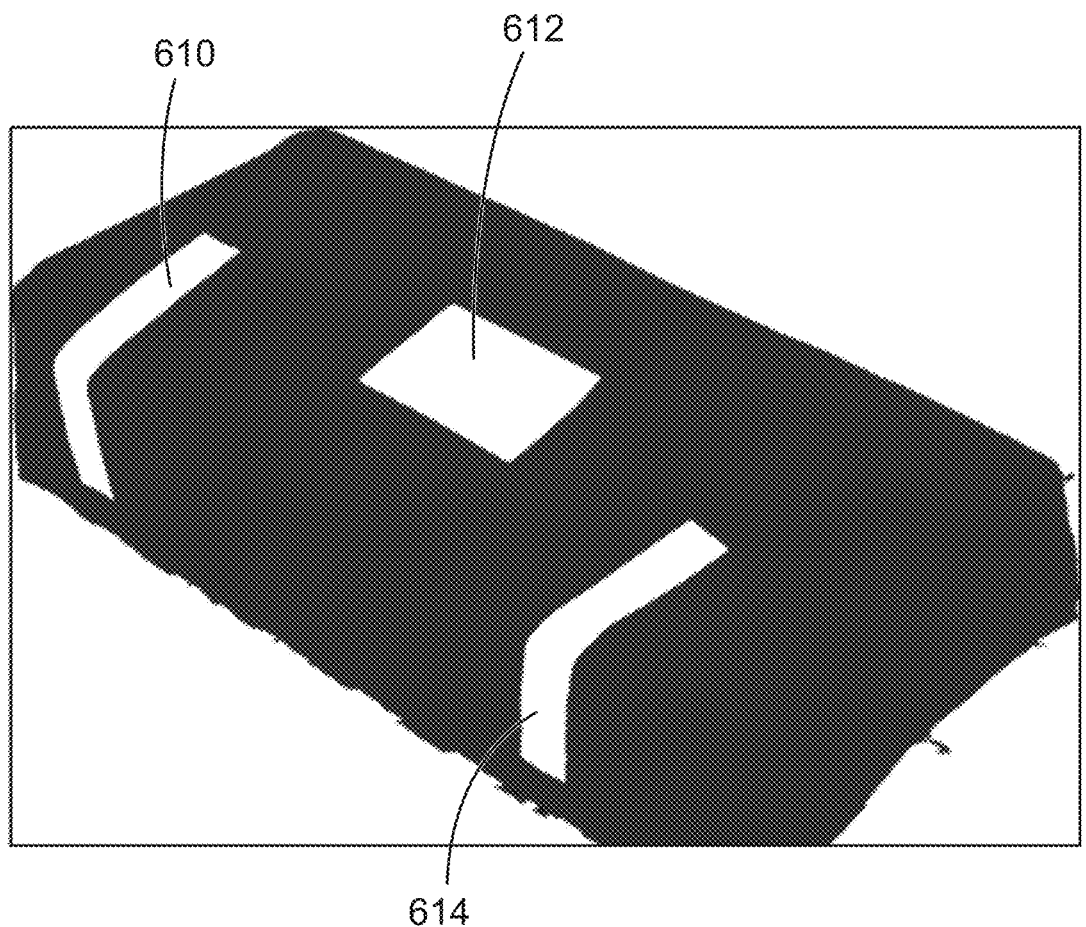
FIG. 6C illustrates a pre-processed image of the wrapped package of FIG. 6A, according to various embodiments.

In at least one embodiment, the computing device can further pre-process the image by performing color thresholding on the image. For example, color thresholding can be applied to the hue, saturation, brightness (HSB) of the image, or combinations thereof. A greyscale image or color image can be thresholded. For example, if the image is color, then thresholding may also be applied to the individual color components of an image (e.g. any of the 3 three color channels in a red, green and blue image). In at least one embodiment, the image may be processed in the HSB color space using any image processing application with one example of an application commercially available as ImageJ from the National Institutes of Health (Bethesda, Md.). The image processing application can be scripted in order to run in an automated fashion. For example, a first threshold may be applied to the Hue, a second threshold may be applied to the Saturation, and a third threshold may be applied to the Brightness. Color thresholding may cause the portion of the image corresponding to the nonwoven sheet of material to become highlighted (e.g. the blue nonwoven in FIG. 6a is highlighted in FIG. 6b with a red color (for clarity)). Turning to FIG. 6C, a central connected component 612 corresponding to a label/optically active article, is flagged, as well as connected components 610 and 614 which correspond to tape segments. The connected components can be extracted from the image and considered in isolation (which is a computer vision technique to compute properties of a particular connected component).

Returning to FIG. 4, in block 430, the computing device can generate a set of feature values based on a visual representation of the wrapped package in the image. The features for the wrapped package can include the connected components identified above. In at least one embodiment, the isolated segment determined in block 420, can be further analyzed. For example, the feature values can be pixel values of the connected component. In at least one embodiment, the set of feature values correspond to features usable to determine a status of the wrapped package and can correspond to the optically active article.

In block 440, the computing device can apply the set of feature values to at least one model that is trained based at least in part on a set of images that include the wrapped package having the status, to determine the status of the wrapped package. In at least one embodiment, the computing device can use machine learning models or other models to identify connected components.

A model can generate a classification corresponding to a quality metric, where the classification is based at least in part on applying feature values to the model. The computing device may perform this classification using machine learning techniques. Example machine learning techniques that may be employed to generate models can include various learning styles, such as supervised learning, unsupervised learning, and semi-supervised learning. Example types of algorithms include Bayesian algorithms, Clustering algorithms, decision-tree algorithms, regularization algorithms, regression algorithms, instance-based algorithms, artificial neural network algorithms, deep learning algorithms, dimensionality reduction algorithms and the like. Various examples of specific algorithms include Bayesian Linear Regression, Boosted Decision Tree Regression, and Neural Network Regression, Back Propagation Neural Networks, the Apriori algorithm, K-Means Clustering, k-Nearest Neighbour (kNN), Learning Vector Quantization (LVQ), Self-Organizing Map (SOM), Locally Weighted Learning (LWL), Ridge Regression, Least Absolute Shrinkage and Selection Operator (LASSO), Elastic Net, and Least-Angle Regression (LARS), Principal Component Analysis (PCA) and Principal Component Regression (PCR).

In some examples, a model is trained using supervised and/or reinforcement learning techniques. In some examples, a computing device initially trains the model based on a training set of (1) sets of infrastructure data that correspond to (2) quality metrics. The training set may include a set of feature vectors, where each feature in the feature vector represents a value in a particular set of infrastructure data and a corresponding quality metric. The computing device may select a training set comprising a set of training instances, each training instance comprising an association between a set of feature values and a corresponding quality metric. The computing device may, for each training instance in the training set, modify, based on a particular infrastructure data and corresponding particular quality metric of the training instance, the model to change a likelihood predicted by the model for the particular quality metric in response to subsequent feature value applied to the model. In some examples, the training instances may be based on real-time or periodic data generated by a group of surgical instruments.

In at least one embodiment, region proposal methods can be used which are methods which are built to provide regions where objects of interest might be present. For example, if it is a plain background, objects with sharp boundaries are not present there and will not be suggested.

Figure 5:
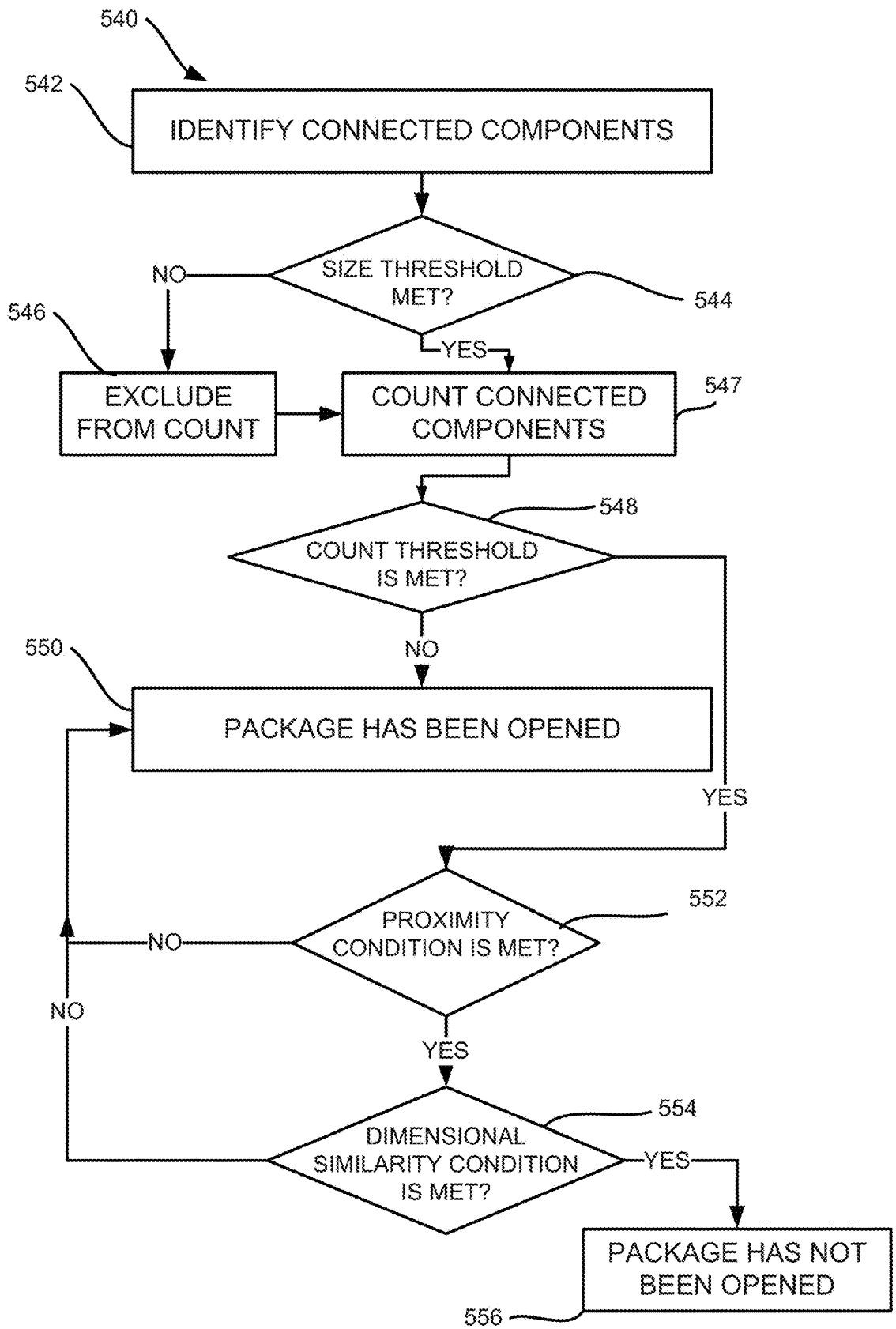
FIG. 5 illustrates a flowchart of a method of determining a status of the wrapped package, according to various embodiments.

In at least one embodiment, the computing device can carry out unsupervised segmentation of the image. For example, it may be likely than not that the segments correspond to object of interest FIG. 5 illustrates an exemplary method 540 of determining the status of the wrapped package that can correspond to an embodiment of block 440 of FIG. 4.

In block 542, the computing device can identify connected components from the image. For example, a color threshold can indicate regions of the image where connected components are likely to be located. The computing device may compute the connected components that appear within the highlighted region. This may be accomplished using libraries available from OpenCV from Itseez. At least one of the connected component is the optically active article.

In block 544, the computing device can determine a first size threshold and a second size threshold for the connected component. The first and second size threshold can be based on either an area or perimeter of a connected component. For example, connected components that are larger than the first size threshold but smaller than the second size threshold can be retained. In at least one embodiment, only connected components larger than the first size threshold can be used. The connected components not meeting the first or second size threshold can be excluded from the count in block 546.

In block 547, the plurality of connected components that meet the first, second size threshold, or combinations thereof are counted.

In block 548, once counted, the computing device can determine whether a count threshold is met by the count. The count threshold can be an number corresponding to an expected number of optically active articles (such as tape). As such, the count threshold may be pre-established. For example, if an operating procedure directs a technician to provide a label and two pieces of tape to secure the wrapped package, then the count threshold can be 3. Any value less than 3 (missing tape) or more than 3 (torn tape) can indicate that the package has been opened in block 550.

The computing device can analyze whether the wrapped package has been opened based on the fulfillment of both a proximity condition and a dimensional similarity condition. The order of blocks 552 and blocks 554 can be order indeterminate.

The proximity condition can indicate whether the connected component corresponding to the optically active article has at least one other connected component disposed proximate to the optically active article. For example, if a wrapped package has a label and two segments of tape positioned on each side of the label and verified by the image, then the proximity condition would be satisfied and the computing device may conclude that two unbroken segments of tape exist and the package has not been opened.

The dimensional similarity condition can indicate similarity of one or more dimensions for one optically active article relative to another optically active article. For example, if there are two segments of tape on a wrapped package, then both segments of tape should be similar in at least one dimension to each other. For example, two dimensions can be similar when a first dimension is within 50%, 40%, or 30% of a second dimension. The dimensions can be selected from the group consisting of size, perimeter, and length, and combinations thereof. For example, connected components corresponding to tape cane be similar in size in terms of pixel count, perimeters, or length.

Once both conditions are met in blocks 552 and 554, the computing device can determine that the status of the wrapped package is not open in block 556.

Returning to FIG. 4, in block 450, the computing device can perform at least one operation based at least in part on the status of the wrapped package. Various operations are discussed herein. For example, the computing device can perform a datastore operation in a datastore based on the status of the wrapped package. For example, if the wrapped package is opened, then the record for the package can indicate that the group of one or more instruments will need to be reprocessed.

Figure 8:
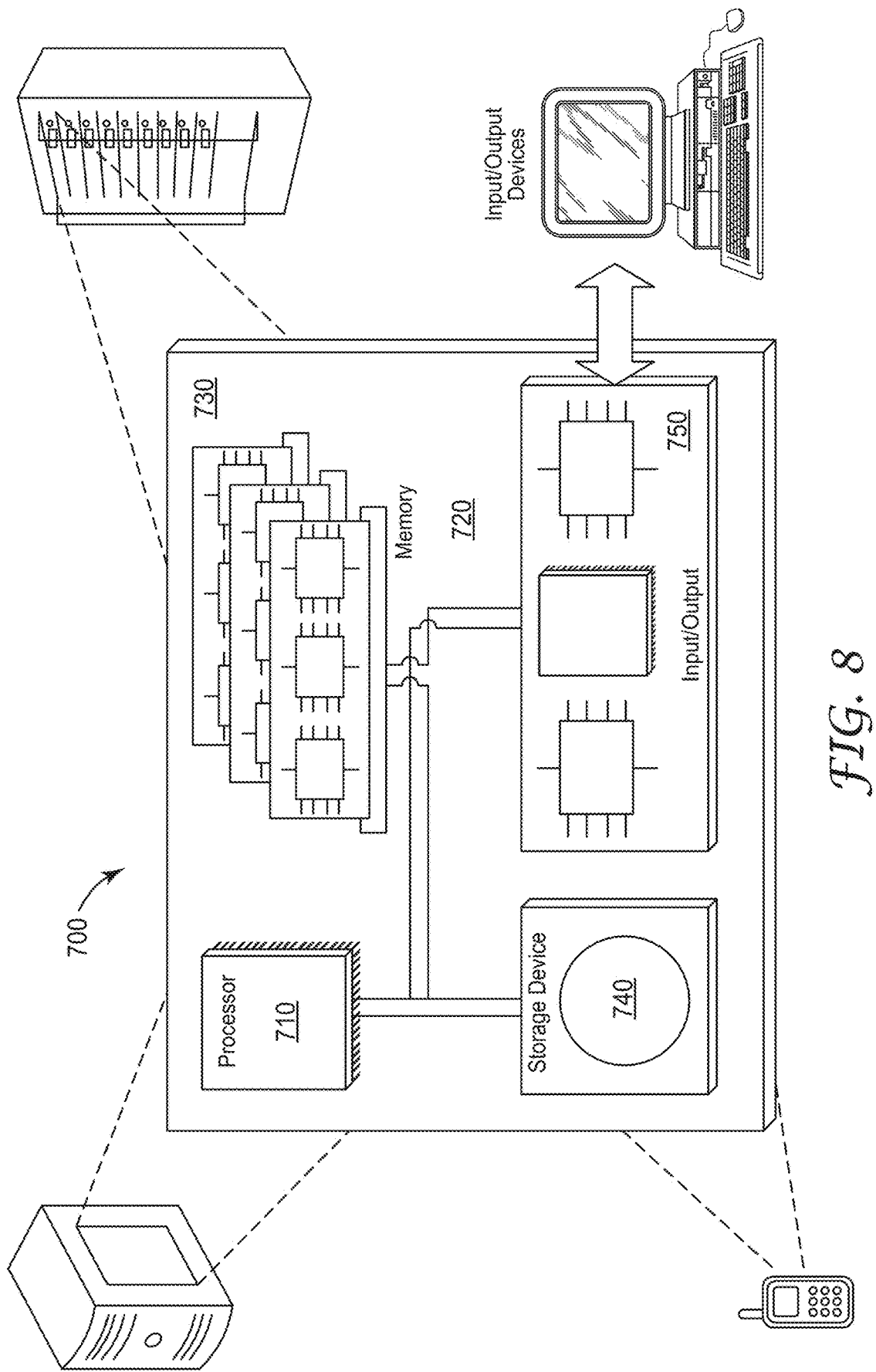
FIG. 8 illustrates a computing device useful in performing aspects of the present disclosure.
Figure 9A:
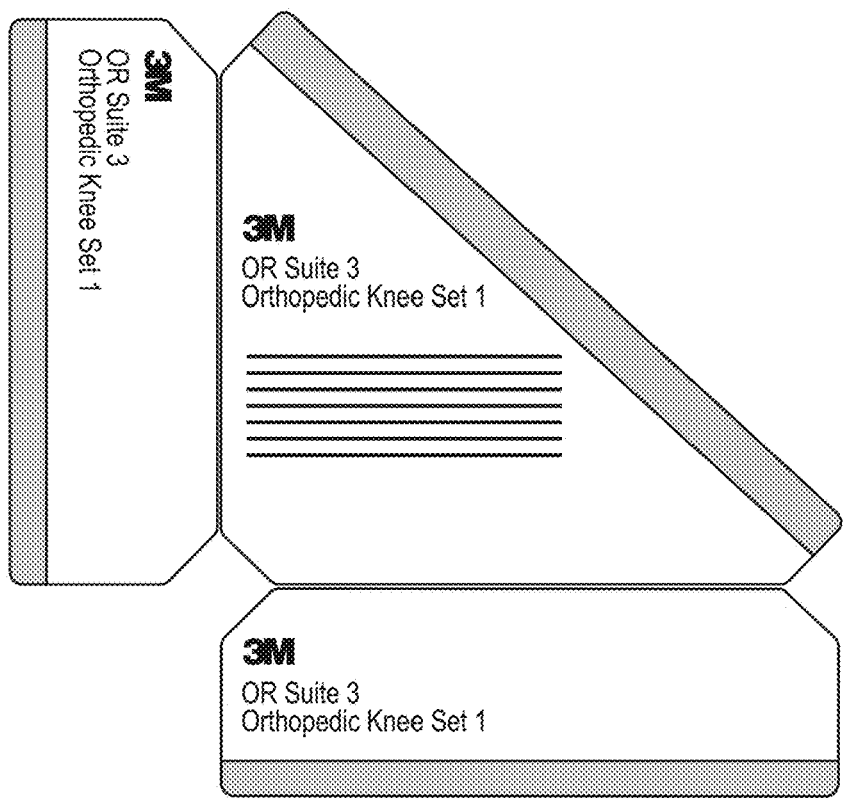
FIGS. 9A and 9B illustrate an exemplary retroreflective tag placed on a wrapped package, according to various embodiments.
Figure 9B:
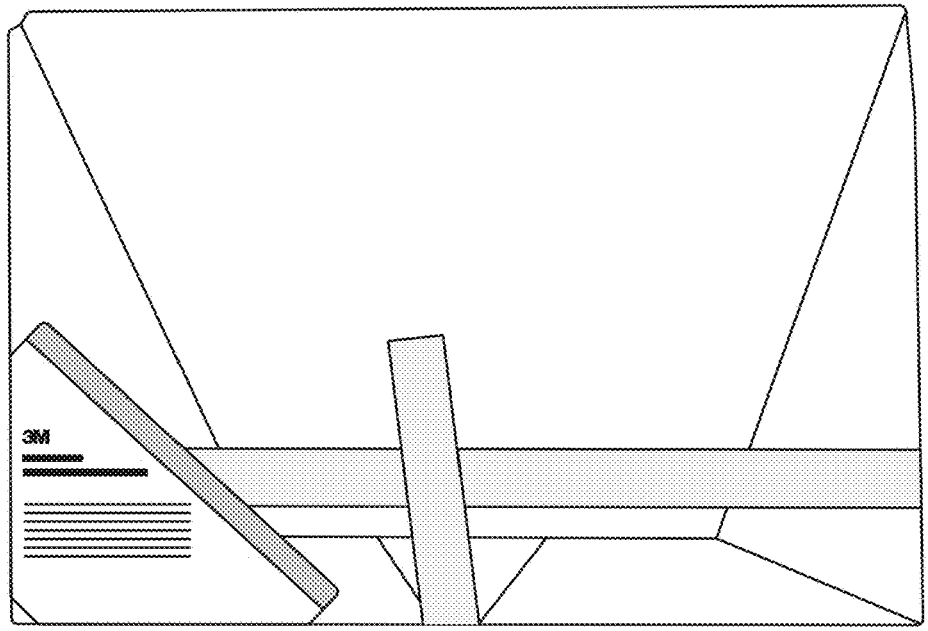

FIG. 8 shows a detailed example of various devices that may be configured to execute program code to practice some examples in accordance with the current disclosure. For example, computing device 700 may be a computing device that performs any of the techniques described herein. In the example illustrated in FIG. 8, a computing device 700 includes a processor 710 that is operable to execute program instructions or software, causing the computer to perform various methods or tasks. Processor 710 is coupled via bus 720 to a memory 730, which is used to store information such as program instructions and other data while the computer is in operation. A storage device 740, such as a hard disk drive, nonvolatile memory, or other non-transient storage device stores information such as program instructions, data files of the multidimensional data and the reduced data set, and other information. The computer also includes various input-output elements 750, including parallel or serial ports, USB, Firewire or IEEE 1394, Ethernet, and other such ports to connect the computer to external device such as a printer, video camera, surveillance equipment or the like. Other input-output elements may include wireless communication interfaces such as Bluetooth™, Wi-Fi™, and cellular data networks.

Various examples and implementations will be described in detail. These examples should not be construed as limiting the scope of the present disclosure in any manner, and changes and modifications may be made without departing from the spirit and scope of the disclosure. Further, only some end uses have been discussed herein, but end uses not specifically described herein are included within the scope of the present disclosure. As such, the scope of the present disclosure should be determined only by the claims.

As used herein, the term "infrared" refers to electromagnetic radiation with longer wavelengths than those of visible radiation, extending from the nominal red edge of the visible spectrum at around 700 nanometers (nm) to over 1000 nm. It is recognized that the infrared spectrum extends beyond this value. The term "near infrared" as used herein refers to electromagnetic radiation with wavelengths between 700 nm and 1300 nm.

As used herein, the term "visible spectrum" or "visible" may refer to the portion of the electromagnetic spectrum that is visible to (i.e., can be detected by) the human eye. A typical human eye will respond to wavelengths from about 390 to 700 nm.

As used herein, the term "optically active" with reference to an article may refer to an article that is at least one of reflective (e.g., aluminum plates), non-retroreflective or retroreflective.

The term "retroreflective" as used herein may refer to the attribute of reflecting an obliquely incident radiation ray in a direction generally antiparallel to its incident direction such that it returns to the radiation source or the immediate vicinity thereof.

As used herein, the term "set" with respect to identifying information can include one or more individual pieces or portions.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor", as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, e.g., through multithreaded processing, interrupt processing, or multiple processors, rather than sequentially.

In some examples, a computer-readable storage medium includes a non-transitory medium. The term "non-transitory" indicates, in some examples, that the storage medium is not embodied in a carrier wave or a propagated signal. In certain examples, a non-transitory storage medium stores data that can, over time, change (e.g., in RAM or cache).

Those having skill in the art will appreciate that many changes may be made to the details of the above-described examples and implementations without departing from the underlying principles thereof. The scope of the present disclosure should, therefore, be determined only by the following claims.

In some examples, an apparatus (e.g., an image capture device) or computing device comprises least one single core or multi core computer processing unit (CPU) and/or graphics processing unit (GPU). In some examples, the CPU is co-located with a camera, that is, disposed within close proximity to the camera. In some examples, the CPU is mounted on the same board as the camera. In other examples, the CPU is not co-located with the camera and is connected to the camera by other means of communication, such as, for example, coaxial cables and/or wireless connections. In some examples, the CPU substantially concurrently processes multiple frames via operating system provided services, such as, for example, time slicing and scheduling. In other examples, the apparatus further comprises at least one multi-core CPU.

In some examples an apparatus or computing device produces bundles of data including, for example, date, time, images, barcode read data, Optical Character Recognition (OCR) read data, and other metadata, that may be useful in sterilization.

In some examples, pre-processing may increase the rate of processing images. In some examples, intelligent selection is performed via field-programmable gate array (FPGA) pre-processing which can process multiple channels at 50 fps. As an example, fifteen images may be processed by OCR from a first channel, but only three barcode images from a second channel may be processed during the same period. This difference in the number of images processed per channel may happen when one of the images (e.g., barcode image) is more complex.

The images of the optically active article may be captured at ambient radiation and/or under radiation conditions added by a designated radiation source (for example, coaxial radiation that directs radiation rays onto the optically active article when the camera is preparing to record an image). The radiation rays produced by the coaxial radiation in combination with the reflective or retroreflective properties of the optically active article create a strong, bright (e.g., above a pre-defined threshold) signal coincident with the location of the optically active article in an otherwise large image scene.

The bright signal may be used to identify the location of the optically active article. Then, the method and/or system for reading optically active articles focuses on the region of interest (the region of brightness) and searches for matches to expected indicia or identifying information by looking for recognizable patterns of contrast. The recognized indicia or identifying information are often provided with some assessment of the confidence in the match to another computer or other communication device for dispatching the information about the observed optically active article.

The radiation detected by the camera can come from any of a number of sources. Of particular interest is the radiation reflected from the optically active article, and specifically, the amount of radiation reflected from each area inside that region of interest on the article. The camera or detection system collects radiation from each region of the optically active article with the goal of creating a difference (contrast) between the background and/or between each indicia or piece of identifying information on the optically active article. Contrast can be effected in numerous ways, including the use of coaxial radiation to overwhelm the amount of ambient radiation. The use of filters on the camera can help accentuate the differences between the indicia or identifying information and background by selectively removing undesired radiation wavelengths and passing only the desired radiation wavelengths.

In some examples, the optically active article is one of a label. Typically, useful wavelengths of radiation at which to capture images of optically active articles are divided into the following spectral regions: visible and near infrared. Typical cameras include sensors that are sensitive to both of these ranges, although the sensitivity of a standard camera system decreases significantly for wavelengths longer than 1100 nm. Various radiation (or light) emitting diodes (LEDs) can emit radiation over the entire visible and near infrared spectra range, and typically most LEDs are characterized by a central wavelength and a narrow distribution around that central wavelength. Alternatively, multiple radiation sources (e.g., LEDs) may be used.

A sensor (detector) which is sensitive to infrared or ultraviolet radiation as appropriate would be used to detect retroreflected radiation outside of the visible spectrum. Exemplary commercially available cameras include but are not limited to the P372, P382, and P492 cameras sold by 3M Company.

In some examples, the present apparatus further includes a third channel capable of detecting at a third wavelength and capable of producing a third image of the optically active article through the third channel. In some examples, the first, second and third wavelengths are all different from each other.

LIST OF ILLUSTRATIVE EMBODIMENTS

1. A computer system for analyzing whether a package has been opened comprising:
a memory;
one or more processors communicatively coupled to the memory and configured to:
receive an image corresponding to a wrapped package comprising a sheet of material disposed around a perimeter of an object and secured by an optically active article disposed on a surface of the sheet of material;
generate a set of feature values based on a visual representation of the wrapped package in the image, wherein the set of feature values correspond to features usable to determine a status of the wrapped package, wherein at least one of the set of feature values corresponds to the optically active article;
apply the set of feature values to at least one model that is trained based at least in part on a set of images that include the wrapped package having the status, to determine the status of the wrapped package; and
perform at least one operation based at least in part on the status of the wrapped package.
2. The system of embodiment 1, wherein the one or more processors are configured to:
pre-process the image responsive to receiving the image.
3. The system of embodiment 2, wherein the one or more processors are configured to pre-process the image by:
performing color thresholding on the image.
4. The system of embodiment 2, wherein the one or more processors are configured to pre-process the image by performing edge detection on the image.
5. The system of embodiment 2, wherein the one or more processors are configured to pre-process the image by performing unsupervised segmentation on the image.
6. The system of embodiment 2, wherein the one or more processors are configured to pre-process the image by performing region proposal methods on the image.
7. The system of any of embodiments 3 to 4, wherein performing color threshold includes thresholding at least one channel of the image.
8. The system of any of embodiments 2 to 7, wherein the image has at least one of the color spaces CIE, RGB, YUV, HSL/HSV, and CMYK.
9. The system of any of embodiments 2 8, wherein the at least one channel is at least one of red, green, blue, cyan, magenta, yellow, black, and combinations thereof.
10. The system of embodiment 3 to 9, wherein performing color thresholding includes thresholding at least one of hue, saturation, brightness, value, luminance, and combinations thereof of the image.
11. The system of embodiment 10, wherein performing color threshold includes grayscale, RGB, LAB, or combinations thereof.
12. The system of any of embodiments 1 to 11, wherein the application of the set of feature values comprises determining a plurality of connected components in a region of the image indicated by the color threshold.
13. The system of embodiment 12, wherein a connected component has a first size threshold and a second size threshold.
14. The system of embodiment 12 or embodiment 13, wherein at least one connected component is the optically active article.
15. The system of embodiment 12, wherein the one or more computer processors is configured to count the plurality of connected components.
16. The system of embodiment 15, wherein the one or more computer processors is configured to determine whether a count threshold is met by a count.
17. The system of embodiment 16, wherein the count threshold is at least one.
18. The system of embodiment 16, wherein the one or more processors is configured to determine if one or more conditions are met by the plurality of connected components.
19. The system of embodiment 18, wherein the condition is the connected component corresponding to the optically active article has at least one other connected component disposed proximate to the optically active article.
20. The system of embodiment 18, wherein the condition is at least two connected components are of similar dimensions.
21. The system of embodiment 20, wherein two dimensions are similar when a second dimension is within 50% of a first dimension.
22. The system of embodiment 20, wherein the dimensions are selected from the group consisting of size, perimeter, and length.
23. The system of any of embodiments 19 to 22, wherein the one or more processors are configured to determine that the status of the wrapped package is open in response to one or more conditions or the count threshold not being met.
24. The system of any of embodiments 19 to 23, wherein the one or more processors are configured to determine that the status of the wrapped package is not open in response to both the one or more conditions and the count threshold being met.
25. The system of any of embodiments 1 to 24, wherein the wrapped package is a sterilization pack comprising a surgical instrument.
26. The system of any of embodiments 1 to 25, wherein the tape is a chemical indicator tape.

27. The system of any of embodiments 1 to 26, wherein the one or more processors is configured to perform a data store operation in a data store based on the status of the wrapped package.

28. The system of any of embodiments 1 to 27, wherein the status is opened or not opened.

29. The system of any of embodiments 1 to 28, further comprising:
an object having at least one perimeter;
a sheet of material disposed around a perimeter of the object;
an image capture device, wherein the one or more processors are configured to receive the image from the image capture device.

30. The system of any of embodiments 1 to 29, further comprising:
a plurality of optically active articles, comprising a first optically active article, and a second optically active article.

31. The system of embodiment 30, wherein the first and second optically active articles are non-reflective.

32. The system of embodiment 30, wherein the first and second optically active articles are contrasting relative to the sheet of material.

33. The system of any of embodiments 30 to 32, wherein the first and second optically active articles are tape.

34. The system of any of embodiments 30 to 33, further comprising: a third optically active article comprising data corresponding to the object.

35. The system of any of embodiments 30 to 34, wherein the third optically active article is retroreflective.

36. The system of any of embodiments 30 to 34, wherein the third optically active article is encoded and corresponds to a record in a datastore.

37. The system of any of embodiments 1 to 36, wherein the object is a group of one or more instruments.

38. The system of embodiment 37, wherein the one or more processors are configured to: receive, from the image capture device, a first image of the optically active article under a first lighting condition;
determine an identity of the group based on first image;
perform at least one operation in response to the determination of the identity of the group.

39. The system of any of embodiments 1 to 38, wherein the material is a non-woven sheet.

40. The system of any of embodiments 1 to 39, wherein the one or more processors is configured to open a template based on the status of the wrapped package.

41. The system of any of embodiments 1 to 40, wherein the operation is a record management operation for the one or more surgical instruments.

42. The system of embodiment 41, wherein the record management operation comprises modifying a record in a datastore for the one or more surgical instruments that the one or more surgical instruments are present.

43. The system of embodiment 42, wherein the record management operation includes a check-in.

44. The system of embodiment 42, wherein the record management operation includes a check-out.

45. A method comprising:
receiving, from an image capture device, an image corresponding to a wrapped package comprising a sheet of material disposed around a perimeter of an object and secured by an optically active article disposed on a surface of the sheet of material;
generating a set of feature values based on a visual representation of the wrapped package in the image, wherein the set of feature values correspond to features usable to determine a status of the wrapped package, wherein at least one of the set of feature values corresponds to the optically active article;
applying the set of feature values to at least one model that is trained based at least in part on a set of images that include the wrapped package having the status, to determine the status of the wrapped package; and performing at least one operation based at least in part on the status of the wrapped package.

46. The method of embodiment 45, further comprising pre-processing the image responsive to receiving the image.

47. The method of embodiment 46, wherein pre-processing the image comprises performing color thresholding on the image.

48. The method of embodiment 47, wherein performing color thresholding includes thresholding at least one of hue, saturation, and brightness of the image.

49. The method of any of embodiments 45 to 48, wherein the applying the set of feature values comprises determining a plurality of connected components in a region of the image indicated by the color threshold.

50. The method of embodiment 49, wherein determining the plurality of connected components comprises determining whether the connected component meets a first size threshold.

51. The method of embodiment 50, wherein determining the plurality of connected components comprises counting the plurality of connected components.

52. The method of embodiment 51, wherein determining the plurality of connected components comprises excluding, from a count, connected components not meeting the first size threshold.

53. The method of embodiment 52, wherein determining the plurality of connected components comprises determining whether the count threshold is met by the count.

54. The method of embodiment 53, wherein the count threshold is at least one.

55. The method of embodiment 54, wherein determining the plurality of connected components comprises determining if one or more conditions are met by the plurality of connected components.

56. The method of embodiment 55, wherein a first condition is a proximity condition and a second condition is a dimensional similarity condition.

57. The method of embodiment 56, wherein determining the plurality of connected components comprises determining that the status of the wrapped package is open in response to one or more conditions or the count threshold not being met.

58. The method of embodiment 56, wherein determining the plurality of connected components comprises determining that the status of the wrapped package is not open in response to both the one or more conditions and the count threshold being met.

Various examples have been described. These and other examples are within the scope of the following claims.

What is claimed is:

1. A computer system for analyzing whether a package has been opened comprising:
a memory;
one or more processors communicatively coupled to the memory and configured to:
receive an image corresponding to a wrapped package comprising a sheet of material disposed around a perimeter of an object and secured by an optically active article disposed on a surface of the sheet of material;

generate a set of feature values based on a visual representation of the wrapped package in the image, wherein the set of feature values correspond to features usable to determine a status of the wrapped package, wherein at least one of the set of feature values corresponds to the optically active article;

apply the set of feature values to at least one model that is trained based at least in part on a set of images that include the wrapped package having the status, to determine the status of the wrapped package; and performing at least one operation based at least in part on the status of the wrapped package.

2. The system of claim 1, wherein the one or more processors are configured to:
pre-process the image responsive to receiving the image.

3. The system of claim 2, wherein the one or more processors are configured to pre-process the image by:
performing color thresholding on the image.

4. The system of claim 3, wherein performing color threshold includes thresholding at least one channel of the image.

5. The system of claim 4, wherein the at least one channel is at least one of red, green, blue, cyan, magenta, yellow, black, and combinations thereof.

6. The system of claim 3, wherein performing color thresholding includes thresholding at least one of hue, saturation, brightness, value, luminance, and combinations thereof of the image.

7. The system of claim 3, wherein application of the set of feature values comprises determining a plurality of connected components in a region of the image indicated by the color threshold formed by performing color thresholding.

8. The system of claim 7, wherein the one or more computer processors is configured to count the plurality of connected components.

9. The system of claim 8, wherein the one or more processors is configured to determine if one or more conditions are met by the plurality of connected components.

10. The system of claim 9, wherein the condition is the connected component corresponding to the optically active article has at least one other connected component disposed proximate to the optically active article.

11. The system of claim 10, wherein the condition is at least two connected components are of similar dimensions.

12. The system of claim 11, wherein the dimensions are selected from the group consisting of size, perimeter, and length.

13. The system of claim 9, wherein the one or more processors are configured to determine that the status of the wrapped package is open in response to one or more conditions not being met.

14. The system of claim 9, wherein the one or more processors are configured to determine that the status of the wrapped package is not open in response to both the one or more conditions and the count threshold being met.

15. The system of claim 1, wherein the wrapped package is a sterilization pack comprising a surgical instrument.

16. The system of claim 1, wherein the one or more processors is configured to perform a record management operation in a data store based on the status of the wrapped package.

17. A method comprising:
receiving, from an image capture device, an image corresponding to a wrapped package comprising a sheet of material disposed around a perimeter of an object and secured by an optically active article disposed on a surface of the sheet of material;

generating a set of feature values based on a visual representation of the wrapped package in the image, wherein the set of feature values correspond to features usable to determine a status of the wrapped package, wherein at least one of the set of feature values corresponds to the optically active article;

applying the set of feature values to at least one model that is trained based at least in part on a set of images that include the wrapped package having the status, to determine the status of the wrapped package; and performing at least one operation based at least in part on the status of the wrapped package.

18. The method of claim 17, further comprising pre-processing the image responsive to receiving the image.

19. The method of claim 18, wherein pre-processing the image comprises performing color thresholding on the image.

20. The method of claim 17, wherein the applying the set of feature values comprises determining a plurality of connected components in a region of the image indicated by the color threshold.

* * * * *